US012594874B2

(12) United States Patent (10) Patent No.: US 12,594,874 B2
Yamasaki et al. (45) Date of Patent: Apr. 7, 2026

(54) VEHICLE WITH ROAD SURFACE RENDERING FUNCTION

(71) Applicant: SUBARU CORPORATION, Tokyo (JP)

(72) Inventors: Kentarou Yamasaki, Tokyo (JP); Makoto Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 80 days.

(21) Appl. No.: 18/431,618

(22) Filed: Feb. 2, 2024

(65) Prior Publication Data

US 2024/0270153 A1 Aug. 15, 2024

(30) Foreign Application Priority Data

Feb. 14, 2023 (JP) ................................. 2023-021180

(51) Int. Cl.
*B60Q 1/08* (2006.01)
(52) U.S. Cl.
CPC .......... *B60Q 1/085* (2013.01); *B60Q 2200/30* (2013.01); *B60Q 2300/322* (2013.01)
(58) Field of Classification Search
CPC ................ B60Q 1/085; B60Q 2200/30; B60Q 2300/322
USPC .......................................................... 701/49
See application file for complete search history.

(56) References Cited

U.S. PATENT DOCUMENTS

| | | | |
|---|---|---|---|
| 10,134,283 B2 | 11/2018 | Masuda et al. | |
| 2002/0036901 A1* | 3/2002 | Horii ....................... | B60Q 1/18 |
| | | | 362/466 |

| | | | |
|---|---|---|---|
| 2012/0158254 A1* | 6/2012 | Takagaki ............... | B60Q 1/085 |
| | | | 701/49 |
| 2015/0149045 A1* | 5/2015 | Mizuno .................... | B60Q 1/08 |
| | | | 701/49 |
| 2018/0126897 A1* | 5/2018 | Hamada ................. | G08G 1/164 |
| 2022/0136674 A1* | 5/2022 | Won ...................... | F21S 41/675 |
| | | | 362/466 |

FOREIGN PATENT DOCUMENTS

| | | | |
|---|---|---|---|
| JP | 2005059662 A | * | 3/2005 |
| JP | 2010-095048 A | | 4/2010 |
| JP | 2015-164828 A | | 9/2015 |
| JP | 2016-055691 A | | 4/2016 |
| JP | 2020-111284 A | | 7/2020 |

OTHER PUBLICATIONS

English translation of JP2005059662 (Year: 2005).*

* cited by examiner

*Primary Examiner* — Tiffany P Young
(74) *Attorney, Agent, or Firm* — Rimon P.C.

(57) ABSTRACT

A vehicle with a road surface rendering function includes a projection member and a controller. The projection member is configured to perform light projection for road surface rendering to a road surface at least forward from the vehicle. The controller is configured to control the light projection for the road surface rendering by the projection member. The controller is configured to, when the vehicle is traveling along a curved road, adjust a road surface rendering image to be rendered on the road surface by projecting light from the projection member to move the road surface rendering image from a reference rendering position in front of the vehicle when the vehicle is traveling along a straight road toward an inside of a curve of the curved road.

7 Claims, 6 Drawing Sheets

VEHICLE WITH ROAD SURFACE RENDERING FUNCTION

CROSS-REFERENCE TO RELATED APPLICATIONS

The present application claims priority from Japanese Patent Application No. 2023-021180 filed on Feb. 14, 2023, the entire contents of which are hereby incorporated by reference.

BACKGROUND

The disclosure relates to a vehicle with a road surface rendering function.

Japanese Unexamined Patent Application Publication Nos. 2016-055691, 2020-111284, 2015-164828, and 2010-095048 disclose that various patterns are rendered on a road surface where a vehicle is traveling by projecting light from the vehicle.

By rendering those patterns on the road surface, the vehicle can provide, for example, a driver who drives the vehicle with information on traveling of the vehicle via the road surface.

SUMMARY

An aspect of the disclosure provides a vehicle with a road surface rendering function. The vehicle includes a projection member and a controller. The projection member is configured to perform light projection for road surface rendering to a road surface at least forward from the vehicle. The controller is configured to control the light projection for the road surface rendering by the projection member. The controller is configured to, when the vehicle is traveling along a curved road, adjust a road surface rendered image to be rendered on the road surface by projecting light from the projection member to move the road surface rendered image from a reference rendering position in front of the vehicle of when the vehicle is traveling along a straight road toward an inside of a curve of the curved road.

An aspect of the disclosure provides a vehicle with a road surface rendering function. The vehicle includes a projection member and circuitry. The projection member is configured to perform light projection for road surface rendering to a road surface at least forward from the vehicle. The circuitry is configured to control the light projection for the road surface rendering by the projection member. The circuitry is configured to, when the vehicle is traveling along a curved road, adjust a road surface rendered image to be rendered on the road surface by projecting light from the projection member to move the road surface rendered image from a reference rendering position in front of the vehicle of when the vehicle is traveling along a straight road toward an inside of a curve of the curved road.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Road surface rendering does not always contribute to improvement in safety of traveling for a driver of a vehicle or the like.

For example, such a traveling condition is conceivable that a road surface rendered image is rendered forward from a vehicle traveling along a curved road in a way similar to that in a case where the vehicle is traveling along a straight road. In this case, the driver of the vehicle views the road surface rendered image rendered forward from the vehicle while paying attention to a point ahead on the curved road. The driver may have a burden on the check on the road surface rendered image rendered away from the point ahead on the curved road.

It is desirable to improve the road surface rendering from the vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. First Embodiment FIG. 1 illustrates an example of a traveling condition of a vehicle 1 such as an automobile according to a first embodiment of the disclosure.

Figure 1:
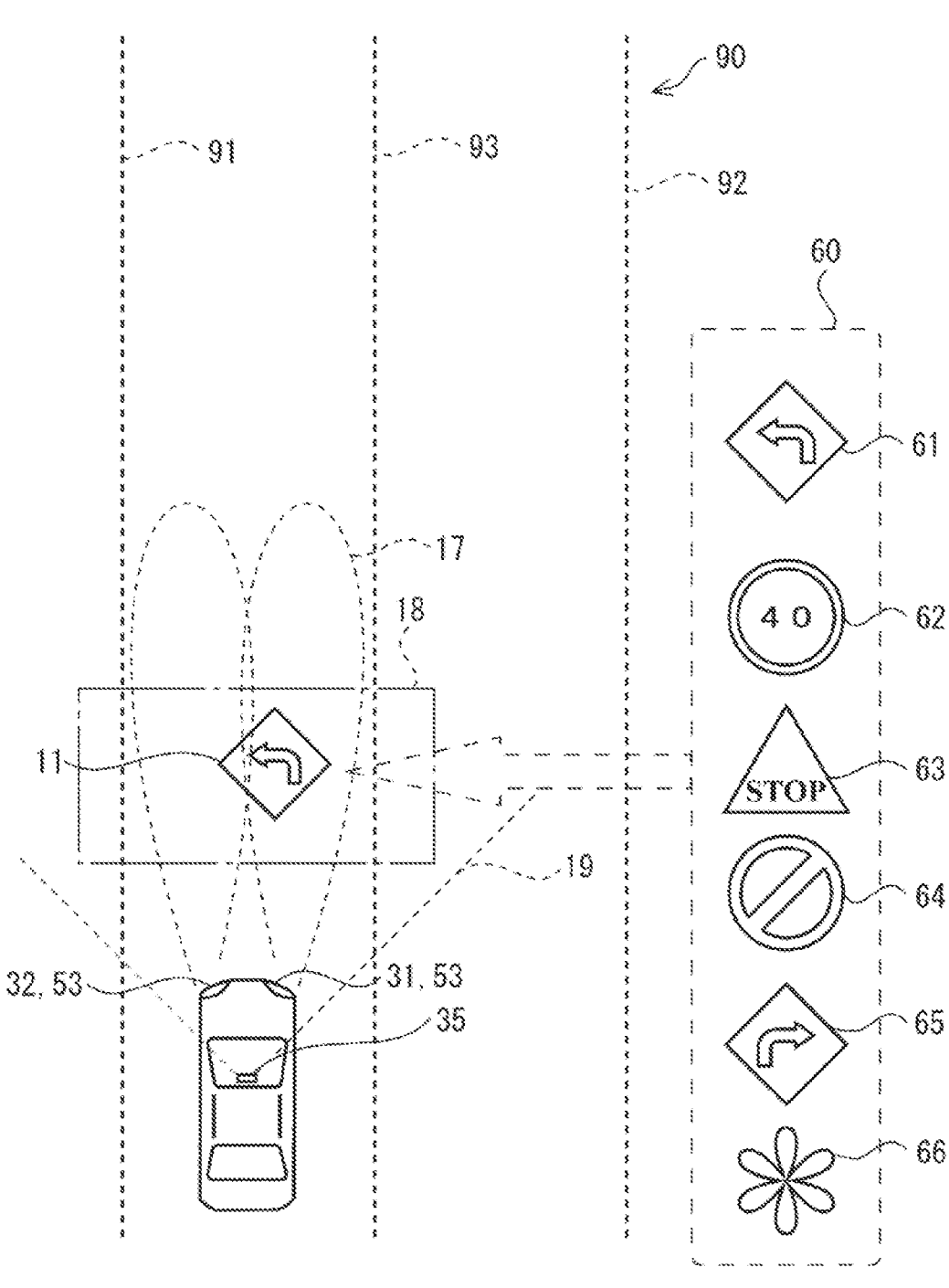
FIG. 1 illustrates an example of a traveling condition of a vehicle according to an embodiment of the disclosure.

FIG. 1 illustrates the vehicle 1 traveling along a road 90 having one lane on one side. The road 90 has a pair of roadside making lines 91 and 92 on both sides. The road 90 has a lane making line 93 at the center. The automobile is an example of the vehicle 1. Other examples of the vehicle 1 include a bus, a truck, a motorcycle, and personal mobility. The vehicle 1 may travel by autonomous driving including drive assist.

The vehicle 1 travels along a traveling lane between the roadside making line 91 and the lane making line 93 of the road 90. Some roads 90 may have neither the roadside making lines 91 and 92 nor the lane making line 93. In this case, the vehicle 1 travels along a traveling lane in a range from a left road shoulder of the road 90 to the center of the road 90.

In a dark traveling environment, the vehicle 1 turns ON headlamps. In FIG. 1, the broken lines indicate radiation ranges 17 of the headlamps.

Research and development have been promoted on drawing a picture by radiating visible light onto a road surface from the vehicle 1.

For example, FIG. 1 illustrates a road surface rendered image 11 showing a simple picture of a traffic sign on the road 90. The road surface rendered image 11 is rendered ahead of the vehicle in its traveling direction for the driver of the vehicle.

On the right side of FIG. 1, projection patterns 60 serving as the road surface rendered image 11 are illustrated. FIG. 1 exemplifies a left turn projection pattern 61, a speed limit projection pattern 62, a stop position projection pattern 63, a no-crossing projection pattern 64, a right turn projection pattern 65, and a projection pattern 66 using a pictogram for attention to snow or freezing. The vehicle 1 selects any one of the projection patterns 60 depending on the traveling condition or the traveling environment, and projects light corresponding to the selected projection pattern.

By rendering the pattern of the road surface rendered image 11 or the like on the road surface, the vehicle 1 can provide, for example, its driver with information on traveling of the vehicle 1 via the road surface.

The road surface rendered image 11 rendered on the road surface by projecting light from the vehicle 1 does not always contribute to improvement in safety of traveling for the driver of the vehicle 1 or the like.

For example, such a traveling condition is conceivable that the road surface rendered image 11 is rendered forward from the vehicle 1 traveling along a curved road 90 in a way similar to that in a case where the vehicle 1 is traveling along a straight road 90.

In this case, the driver of the vehicle 1 views the road surface rendered image 11 rendered forward from the vehicle 1 while paying attention to a point ahead on the curved road 90. The driver may have a burden on the check on the road surface rendered image 11 rendered away from the point ahead on the curved road 90.

Figure 2:
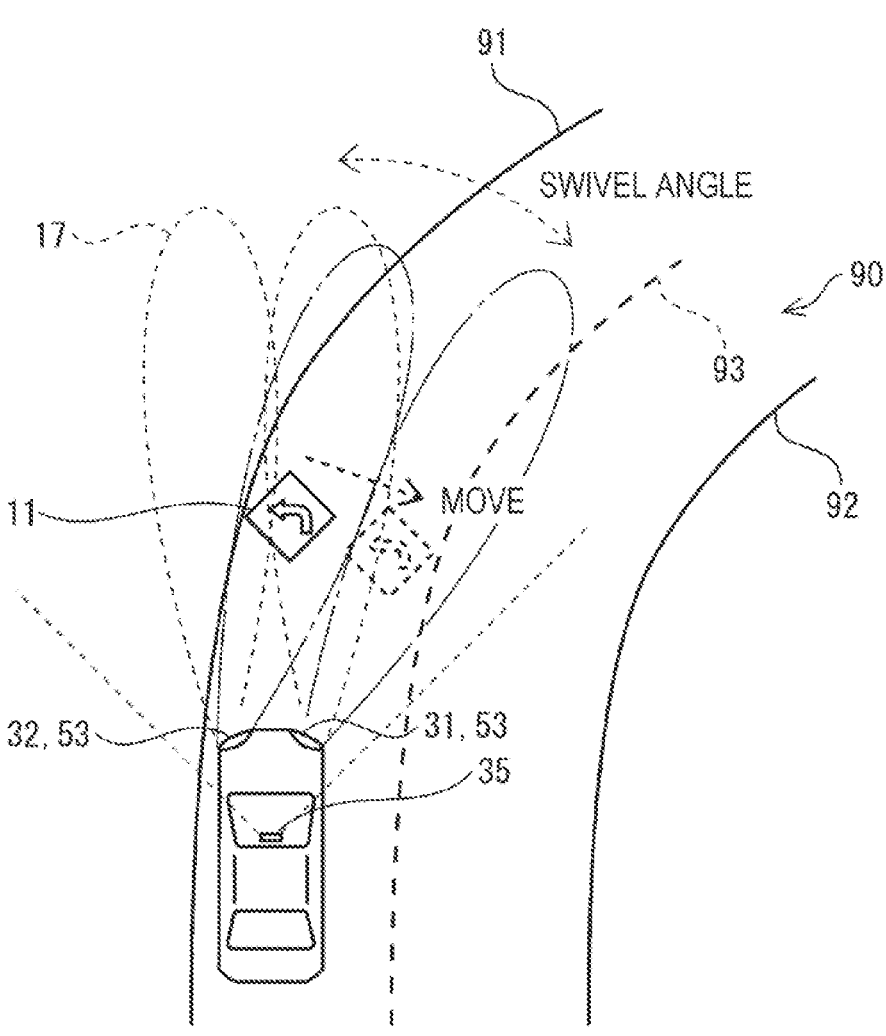
FIG. 2 illustrates an example of a traveling condition in which the vehicle of FIG. 1 is traveling along a curved road.

FIG. 2 illustrates an example of a traveling condition in which the vehicle 1 of FIG. 1 is traveling along the curved road 90.

In FIG. 2, the vehicle 1 is traveling along a right-hand curved road 90.

In this case, the radiation ranges 17 of the headlamps of the vehicle 1 of FIG. 1 are outside the right-hand curve. The headlamps of the vehicle 1 may have a function of swiveling the radiation ranges 17 toward the curve. By swiveling the headlamps of the vehicle 1, the radiation ranges of the headlamps may fit in the traveling lane of the right-hand curved road 90.

In FIG. 2, the road surface rendered image 11 is rendered forward from the vehicle 1 in a way similar to that in a case where the vehicle 1 is traveling along the straight road 90 of FIG. 1. The road surface rendered image 11 is rendered away from the point ahead on the right-hand curved road 90.

It is desirable to improve the road surface rendering from the vehicle.

Figure 3:
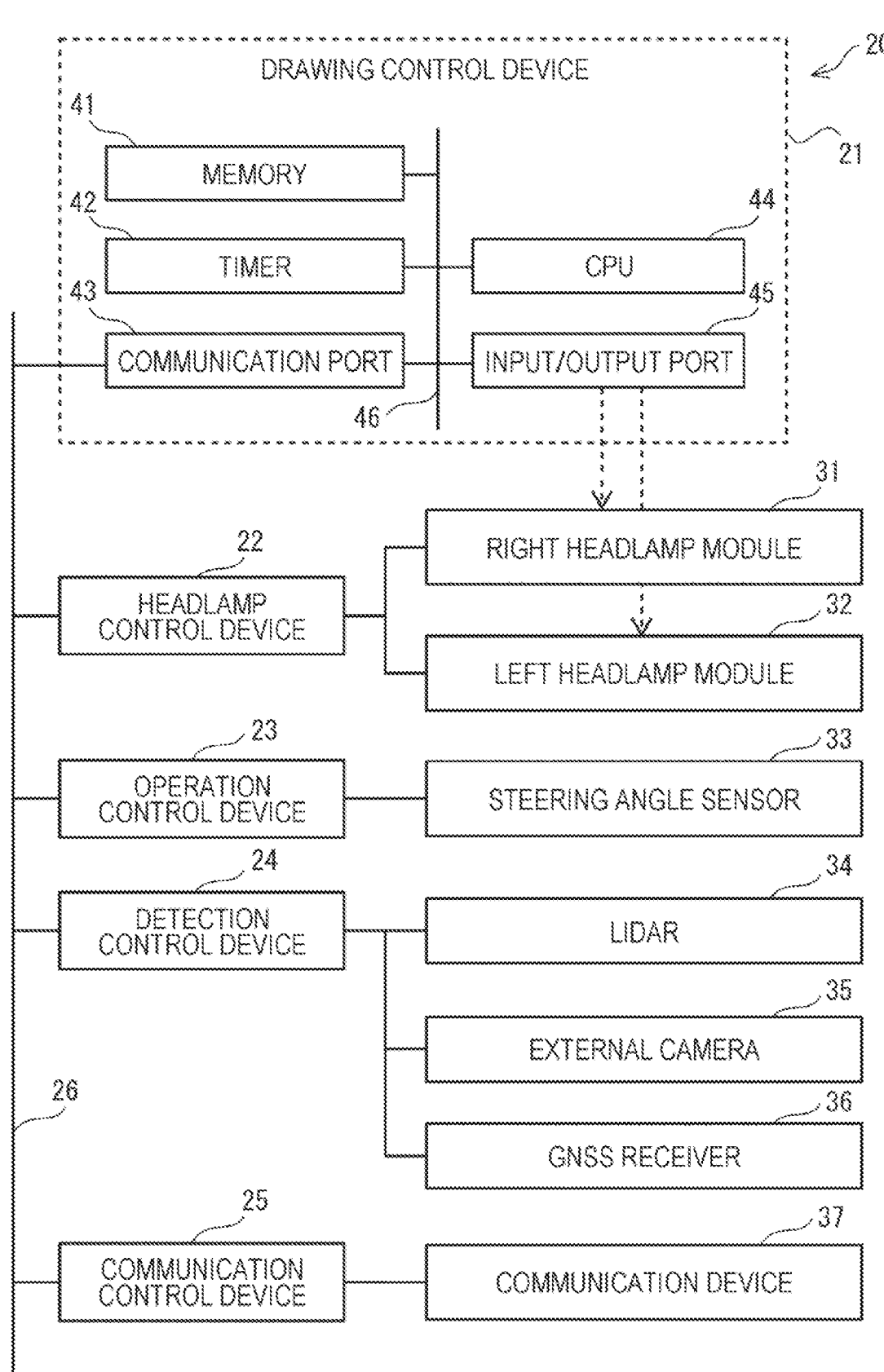
FIG. 3 illustrates a control system provided in the vehicle of FIG. 1.

FIG. 3 illustrates a control system 20 provided in the vehicle 1 of FIG. 1.

The control system 20 of the vehicle 1 of FIG. 3 includes control devices and a vehicle network 26 to which the control devices are coupled.

For example, the vehicle network 26 may be a wired communication network conforming to a controller area network (CAN) or a local interconnect network (LIN) for the vehicle 1. The vehicle network 26 may be a communication network such as a LAN or a combination of those networks. The vehicle network 26 may partly include a wireless communication network. The various devices coupled to the vehicle network 26 can exchange information via the vehicle network 26.

FIG. 3 illustrates a rendering control device 21, a headlamp control device 22, an operation control device 23, a detection control device 24, and a communication control device 25 as examples of the control devices. Other control devices such as a traveling control device and an air conditioning control device may be coupled to the vehicle network 26. Each control device illustrated in FIG. 3 may be coupled to the vehicle network 26 while being divided into multiple parts.

A right headlamp module 31 and a left headlamp module 32 provided at the front end of the vehicle 1 are coupled to the headlamp control device 22. In one embodiment, the right headlamp module 31 and the left headlamp module 32 may serve as a headlamp member configured to project light forward from the vehicle 1.

The right headlamp module 31 and the left headlamp module 32 of this embodiment include projection modules 53 for road surface rendering as described later. In one embodiment, the projection module 53 of the right headlamp module 31 and the projection module 53 of the left headlamp module 32 may serve as a projection member configured to project light for road surface rendering to a road surface at least forward from the vehicle 1. That is, the projection member may include a light source.

The headlamp control device 22 controls a lighting status of the right headlamp module 31 and a lighting status of the left headlamp module 32 based on information acquired via the vehicle network 26 about an operation on a lamp operation lever (not illustrated) and a detection value from an automatic light intensity sensor (not illustrated). With the lamp operation lever, an operation state such as "low beam", "high beam", or "OFF" can be set in general.

The headlamp control device 22 may output information on the lighting statuses of the right headlamp module 31 and the left headlamp module 32 to other control devices via the vehicle network 26.

Various operation members to be operated by an occupant such as the driver are coupled to the operation control device 23. FIG. 3 exemplifies a steering angle sensor 33 as the operation member. The steering angle sensor 33 detects a steering angle of a steering wheel steered by the driver. The steering angle sensor 33 may detect a steering angle of each steered wheel of the vehicle 1.

The operation control device 23 may output information on the operation states of the various operation members such as the steering angle sensor 33 to other control devices via the vehicle network 26.

Various detection members that detect the traveling condition and the traveling environment of the vehicle 1 are coupled to the detection control device 24. FIG. 3 exemplifies a lidar 34, an external camera 35, and a global navigation satellite system (GNSS) receiver 36 as the detection members.

The detection control device 24 may output, for example, detection information from each detection member to other control devices via the vehicle network 26.

The lidar 34 scans a forward space in a traveling direction of the vehicle 1 with a laser, and generates information on a road 90 and objects in the space ahead of the vehicle 1.

As illustrated in FIG. 1, the external camera 35 is oriented forward in the cabin on the inner side of the windshield of the vehicle 1. The external camera 35 can capture an image of a forward view in the traveling direction of the vehicle 1 in a wide range due to an angle of view 19. The vehicle 1 may include multiple external cameras 35. The external cameras 35 may capture images separately around the vehicle 1. The external camera 35 may be a 360-degree camera or a stereo camera.

The image captured by the external camera 35 may include, as its detection image, an image rendered by projecting light onto a road surface.

The external camera 35 and the lidar 34 are detection members that detect an area around the vehicle 1.

The GNSS receiver 36 receives radio waves from GNSS satellites to detect information on time and the position of the vehicle 1 including the GNSS receiver 36.

A communication device 37 is coupled to the communication control device 25. The communication device 37 exchanges information with a server device via a base station (not illustrated) or the like. Examples of the base station include a 5G base station and a base station for advanced driver assistance systems (ADAS) or intelligent transport systems (ITS). Some 5G base stations may have functions of a server device. The communication device 37 may directly communicate with other vehicles 1 or the like by vehicle-to-X (V2X) communication.

For example, the communication control device 25 may receive, from a server device, high-accuracy map data including information on the shapes and lanes of roads 90.

The communication control device 25 may transmit information acquired via the vehicle network 26 from the communication device 37 to a base station or a server device, or may output, to the vehicle network 26, information received by the communication device 37 from a base station or a server device.

The rendering control device 21 includes a memory 41, a timer 42, a communication port 43, an input/output port 45, a CPU 44, and an internal bus 46 to which those components are coupled. The control devices provided in the control system 20 basically have structures similar to that of the rendering control device 21.

The right headlamp module 31 and the left headlamp module 32 are coupled to the input/output port 45.

The communication port 43 is coupled to the vehicle network 26. The communication port 43 acquires information from the vehicle network 26, and outputs, to the vehicle network 26, information to be output by the rendering control device 21.

The timer 42 measures a period or time. The time of the timer 42 may be calibrated by the time of the GNSS receiver 36.

For example, the memory 41 may include a semiconductor memory, a hard disk drive (HDD), and a random access memory (RAM). The HDD is a non-volatile memory. The RAM is a volatile memory. The memory 41 records programs to be executed by the CPU 44 and various types of information to be used during execution of the programs as data. For example, the memory 41 records data on the projection patterns 60 illustrated in FIG. 1. The memory 41 may record high-accuracy map data including information on the shapes and lanes of roads 90.

The CPU 44 reads and executes the programs recorded in the memory 41. Therefore, the CPU 44 serves as a controller of the rendering control device 21. In one embodiment, the CPU 44 may serve as a controller configured to control light projection for the road surface rendering by the projection member.

The CPU 44 controls the operation of the rendering control device 21. The CPU 44 outputs signals to the right headlamp module 31 and the left headlamp module 32 via the communication port 43. In this way, the CPU 44 controls the operations of the projection modules 53 provided in the right headlamp module 31 and the left headlamp module 32 for the road surface rendering. The right headlamp module 31 and the left headlamp module 32 are lit in a projection pattern for the road surface rendering. For example, as illustrated in FIG. 1, the road surface rendered image 11 corresponding to the projection pattern may be rendered on the road surface.

Figure 4:
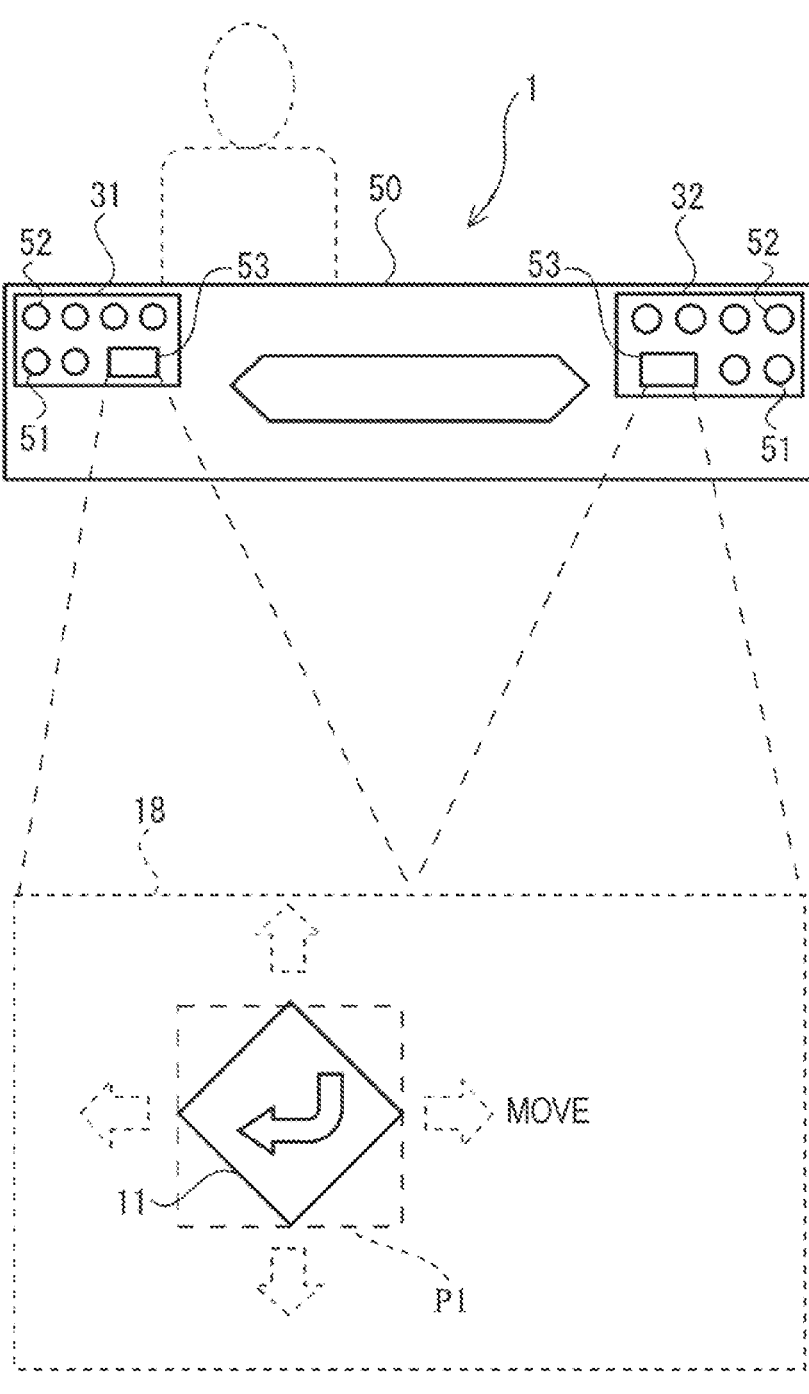
FIG. 4 schematically illustrates the structure and disposition of a right headlamp module and a left headlamp module at the front end of the vehicle of FIG. 1.

FIG. 4 schematically illustrates the structure and disposition of the right headlamp module 31 and the left headlamp module 32 at the front end of the vehicle 1 of FIG. 1.

FIG. 4 illustrates the front end of the vehicle 1.

The right headlamp module 31 is provided at the right front end of the vehicle 1. The right headlamp module 31 includes low-beam light emitting diodes (LEDs) 51, high-beam LEDs 52, and the micro electro mechanical systems (MEMS) projection module 53.

The left headlamp module 32 is provided at the left front end of the vehicle 1. The left headlamp module 32 includes low-beam LEDs 51, high-beam LEDs 52, and the MEMS projection module 53.

For example, the projection module 53 may be a digital micromirror device (DMD).

The headlamp control device 22 controls the low-beam LEDs 51 and the high-beam LEDs 52 to change their orientations based on the steering angle detected by the steering angle sensor 33 and the shape of the road 90 where the vehicle 1 is traveling. Through such swivel control, the radiation ranges 17 of the headlamps change to fit in the road 90 as indicated by the chain lines in FIG. 2. After the swivel control, the orientations of the headlamps are changed by a swivel angle with respect to the forward direction of the vehicle 1.

In one embodiment, the low-beam LEDs 51 and the high-beam LEDs 52 may serve as the headlamp member configured to swivel to shift the light projection direction toward the inside of the curve when the vehicle 1 is traveling along the curved road 90. Hereinafter, the shifting of the light projection direction toward the inside of the curve may include shifting of the light projection direction to the inside of the curve.

For example, the MEMS projection module 53 projects light by reflecting light from a three-color light source by MEMS elements. The reflection state of each MEMS element may be controlled based on an image signal.

The right headlamp module 31 or the left headlamp module 32 may use a device that can render an image on a road surface, except for the MEMS projection module 53.

FIG. 4 illustrates a reference rendering position P1 of the road surface rendered image 11 and a renderable range 18 in which the MEMS projection modules 53 can execute the road surface rendering.

The reference rendering position P1 is a position where the road surface rendered image 11 is to be rendered near an area in front of the driver of the vehicle 1 when the vehicle 1 is traveling along a straight road 90.

The renderable range 18 is a range in which the MEMS projection modules 53 can render the road surface rendered image 11.

The position of the road surface rendered image 11 can be moved, for example, forward, rearward, rightward, or leftward within the renderable range 18.

The size of the road surface rendered image 11 can be increased or reduced to fit in the renderable range 18.

As illustrated in FIG. 1, the renderable range 18 is basically wider in a vehicle width direction than the width of the traveling lane and the radiation ranges 17 of the headlamps. Thus, the road surface rendered image 11 can be rendered in the radiation ranges 17 of the headlamps even during the swivel control on the headlamps.

The memory 41 may record information on the reference rendering position P1 and the renderable range 18 of the road surface rendering.

In FIG. 4, the MEMS projection module 53 of the right headlamp module 31 projects light to render a right turn road surface rendered image 11 corresponding to the right turn projection pattern 65 on a road surface.

The MEMS projection module 53 of the right headlamp module 31 and the MEMS projection module 53 of the left headlamp module 32 may render one large road surface rendered image 11 on the road surface in cooperation.

The CPU 44 controls the MEMS projection module 53 of the right headlamp module 31 and the MEMS projection module 53 of the left headlamp module 32 based on the projection pattern to render the road surface rendered image 11 corresponding to the projection pattern on the road surface.

In one embodiment, the MEMS projection module 53 of the right headlamp module 31 and the MEMS projection module 53 of the left headlamp module 32 may serve as the projection member configured to project the road surface rendered image 11 based on the projection pattern.

Figure 5:
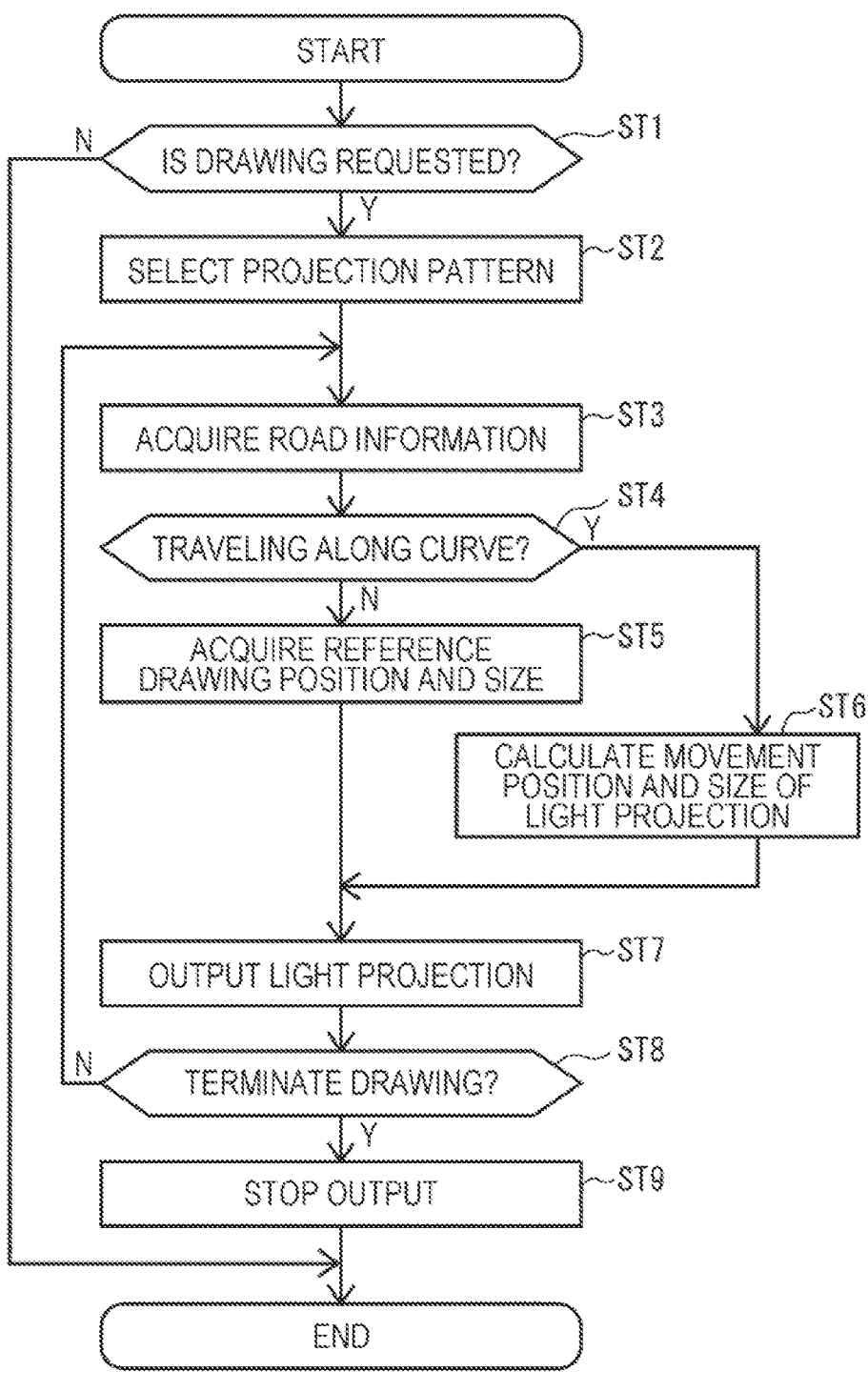
FIG. 5 is a flowchart of road surface rendering control of the embodiment to be executed by a rendering control device of FIG. 3.

FIG. 5 is a flowchart of road surface rendering control of the first embodiment to be executed by the rendering control device 21 of FIG. 3.

The CPU 44 of the rendering control device 21 repeats the road surface rendering control of FIG. 5.

In one embodiment, if the headlamp control device 22 has a rendering control function in the control system 20, a CPU of the headlamp control device 22 may serve as the controller to repeat the road surface rendering control of FIG. 5.

In Step ST1, the CPU 44 that controls light projection for road surface rendering determines whether the road surface rendering is requested. The request for the road surface rendering may be generated by various control devices of the control system 20. For example, when lighting the headlamps, the headlamp control device 22 may generate information for requesting the road surface rendering and output the information to the rendering control device 21 via the vehicle network 26. When the road surface rendering is requested, the CPU 44 advances the process to Step ST2. When the road surface rendering is not requested, the CPU 44 terminates this control.

In Step ST2, the CPU 44 selects a projection pattern to be used for the road surface rendering from among the projection patterns 60 recorded in the memory 41. The CPU 44 may select multiple projection patterns or one projection pattern.

In Step ST3, the CPU 44 acquires road information.

For example, the CPU 44 may acquire, as the road information, the latest image captured by the external camera 35, the high-accuracy map data recorded in the memory 41, and a current position generated by the GNSS receiver 36. The CPU 44 may acquire space information including a road surface from the detection control device 24 and the lidar 34.

Alternatively, the CPU 44 may acquire a steering angle detected by the steering angle sensor 33 in association with the shape of the road.

In Step ST4, the CPU 44 determines whether the vehicle 1 is traveling along a curved road 90 based on the road information acquired in Step ST3.

For example, when the latest image captured by the external camera 35 is acquired as the road information, the CPU 44 may analyze the captured image and determine whether the vehicle 1 in the captured image is traveling along a curved road 90.

When the current position generated by the GNSS receiver 36 is acquired as the road information, the CPU 44 acquires road shape information at the current position in the high-accuracy map data. The CPU 44 may determine whether the road shape information at the current position indicates a curve.

When the space information is acquired as the road information, the CPU 44 may analyze the space information and determine whether the vehicle 1 is traveling along a curved road 90.

When the steering angle detected by the steering angle sensor 33 is acquired as the road information, the CPU 44 may determine whether the steering angle is a straightforward steering angle. When the steering angle is not the straightforward steering angle, the CPU 44 may determine that the vehicle 1 is traveling along a curved road 90.

When the vehicle 1 is traveling along or is expected to enter a curved road 90, the CPU 44 determines that the vehicle 1 is traveling along the curved road 90. In this case, the CPU 44 advances the process to Step ST6. When the vehicle 1 is not traveling along and is not expected to enter a curved road 90, the CPU 44 determines that the vehicle 1 is not traveling along the curved road. In this case, the CPU 44 advances the process to Step ST5 under the assumption that the vehicle 1 is traveling along a straight road 90.

In Step ST5, the CPU 44 acquires information on the reference rendering position P1 from the memory 41 under the assumption that the vehicle 1 is traveling along the straight road 90.

In addition, the CPU 44 may acquire a standard size of the road surface rendered image 11 to be rendered at the reference rendering position P1 from the memory 41.

Then, the CPU 44 advances the process to Step ST7.

In Step ST6, the CPU 44 calculates the position and size of light projection for rendering the road surface rendered image 11 on the surface of the road 90 under the assumption that the vehicle 1 is traveling along the curved road 90.

For example, the CPU 44 first acquires the information on the reference rendering position P1 and the standard size from the memory 41 and the steering angle detected by the steering angle sensor 33 in association with the shape of the road.

The CPU 44 calculates a rendering position of the road surface rendered image 11 to be moved from the reference rendering position P1 by an angle corresponding to the steering angle. The CPU 44 calculates a rendering size of the road surface rendered image 11 at the calculated rendering position.

In this way, the CPU 44 can generate the position and size of light projection for rendering the road surface rendered image 11 on the surface of the road 90. The generated position of light projection is adjusted to move the road surface rendered image 11 from the reference rendering position P1 in front of the vehicle 1 when the vehicle 1 is traveling along a straight road toward the inside of the curve.

The CPU 44 may determine whether the road surface rendered image 11 to be obtained by projecting light at the calculated rendering position and in the calculated rendering size is expected to be outside the traveling lane. When the road surface rendered image 11 is expected to be outside the traveling lane, the CPU 44 may finely adjust the calculated position and size of light projection so that the road surface rendered image 11 is not rendered outside the traveling lane. When the vehicle 1 is traveling along the curved road 90, the road surface rendered image 11 becomes unlikely to be outside the traveling lane by, for example, finely adjusting the position of light projection away from the vehicle 1.

In this way, the CPU 44 can adjust the position and size of the road surface rendered image 11 to be rendered on the road surface by projecting light from the projection modules 53 to move the road surface rendered image 11 toward the inside of the curve within a range in which the road surface rendered image 11 is not outside the widthwise central position or the lane on the road 90 where the vehicle 1 is traveling.

In Step ST7, the CPU 44 controls the projection modules 53 to project light for the road surface rendered image 11.

By executing Step ST7 after the process of Step ST6, the road surface rendered image 11 is rendered on the surface of the right-hand curved road 90 at a position indicated by the broken lines instead of the position indicated by the solid lines in FIG. 2.

The rendering position of the road surface rendered image 11 approaches a position between the driver of the vehicle 1 and the point ahead on the curve.

In Step ST8, the CPU 44 determines whether to terminate the road surface rendering. The CPU 44 may determine to terminate the road surface rendering, for example, when the road surface rendering is not requested. In this case, the CPU 44 terminates this control. In this case, the CPU 44 advances the process to Step ST9.

When the road surface rendering is still requested, the CPU 44 determines not to terminate the road surface rendering, and returns the process to Step ST3. In this case, the CPU 44 repeats the process from Step ST3 to Step ST8 to continue the road surface rendering.

In Step ST9, the CPU 44 controls the projection modules 53 to stop the light projection for the road surface rendered image 11. Thus, the road surface rendered image 11 is not rendered on the surface of the road 90.

In this embodiment described above, when the vehicle 1 is traveling along the curved road 90, the CPU 44 that controls the light projection for the road surface rendering by the projection modules 53 adjusts the road surface rendered image 11 to be rendered on the road surface by projecting light from the projection modules 53 to move the road surface rendered image 11 from the reference rendering position P1 in front of the vehicle 1 when the vehicle is traveling along a straight road toward the inside of the curve.

Thus, the road surface rendered image 11 is rendered on the curved road 90 not forward from the vehicle 1 but inside the curve. The road surface rendered image 11 is rendered near the point ahead on the curved road 90. The driver becomes unlikely to have a burden on the check on the road surface rendered image 11 rendered near the point ahead on the curved road 90.

In this embodiment, the improvement in the road surface rendering from the vehicle 1 can be expected by controlling the light projection for the road surface rendering.

Second Embodiment

Next, description is made about a road surface rendering device of a vehicle 1 according to a second embodiment of the disclosure.

This embodiment is directed to an example in which the rendering can be continued even when the road surface rendered image 11 has a missing part due to insufficient light intensity.

The differences from the embodiment described above are mainly described below.

Figure 6:
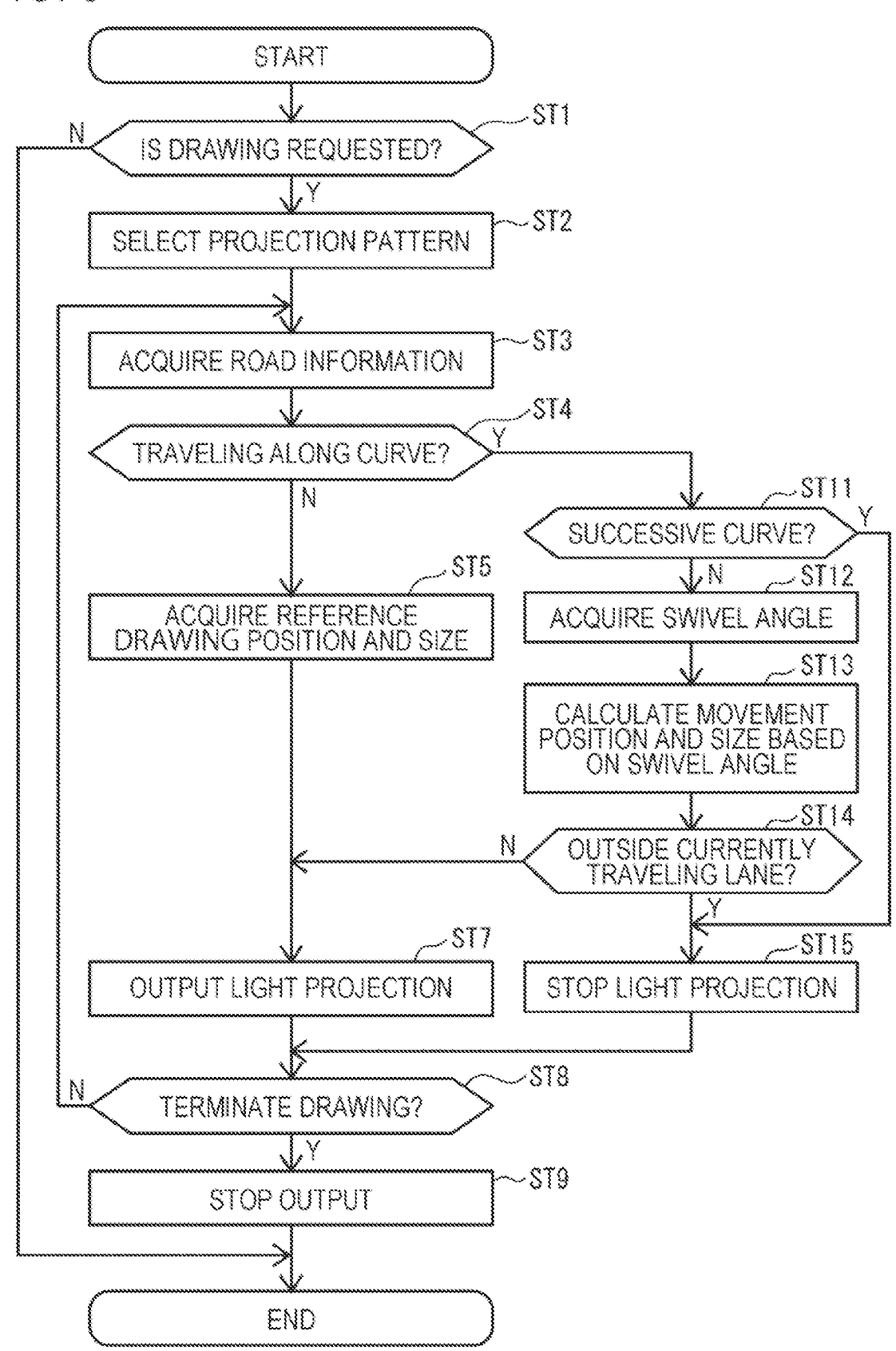
FIG. 6 is a flowchart of road surface rendering control of an embodiment to be executed by the rendering control device of FIG. 3.

FIG. 6 is a flowchart of the road surface rendering control of the second embodiment to be executed by the rendering control device 21 of FIG. 3.

The CPU 44 of the rendering control device 21 repeats the road surface rendering control of FIG. 6.

If the headlamp control device 22 has the rendering control function in the control system 20, the CPU of the headlamp control device 22 may repeat the road surface rendering control of FIG. 6.

Step ST1 to Step ST4 are similar to those in the embodiment described above.

When the vehicle 1 is traveling along or is expected to enter a curved road 90 in Step ST4, the CPU 44 advances the process to Step ST11.

In Step ST11, the CPU 44 determines whether the vehicle 1 is traveling along a successively curved road 90.

For example, when the latest image captured by the external camera 35 is acquired as the road information, the CPU 44 may analyze the captured image and determine whether the vehicle 1 in the captured image is traveling along a successively curved road 90.

When the current position generated by the GNSS receiver 36 is acquired as the road information, the CPU 44 acquires road shape information at the current position in the high-accuracy map data. The CPU 44 may determine whether the road shape information at the current position indicates a successive curve.

When the space information is acquired as the road information, the CPU 44 may analyze the space information and determine whether the vehicle 1 is traveling along a successively curved road 90.

When the vehicle 1 is traveling along or is expected to enter a successively curved road 90, the CPU 44 determines that the vehicle 1 is traveling along the successively curved road 90. In this case, the CPU 44 advances the process to Step ST15.

When the vehicle 1 is not traveling along and is not expected to enter a successively curved road 90, the CPU 44 determines that the vehicle 1 is not traveling along the successively curved road 90. In this case, the CPU 44 advances the process to Step ST12 under the assumption that the vehicle 1 is traveling along a non-successively curved road 90.

In Step ST12, the CPU 44 acquires a swivel angle of the headlamps with respect to the forward direction of the vehicle 1 from the headlamp control device 22.

In Step ST13, the CPU 44 calculates the position and size of light projection for the road surface rendered image 11 based on the swivel angle of the headlamps acquired in Step ST12.

The CPU 44 may calculate the position and size of light projection for the road surface rendered image 11 in association with the swivel angle.

At this time, the CPU 44 may calculate the position of light projection for the road surface rendered image 11 to move the road surface rendered image 11 by the swivel angle itself or by an angle obtained by multiplying the swivel angle by a coefficient.

It is considered that the road surface rendered image 11 is generally rendered behind the front ends of the radiation ranges 17 of the headlamps. In this case, the CPU 44 may calculate the movement position of light projection for the road surface rendered image 11 by using an angle obtained by multiplying the swivel angle by a coefficient smaller than 1. In this way, the road surface rendered image 11 is expected to be rendered within the range of light projection of the swiveled headlamps.

Thus, the CPU 44 can calculate the position of light projection for the road surface rendered image 11 to move the road surface rendered image 11 toward the inside of the curve depending on the swivel angle of the headlamps.

The CPU 44 may adjust the size of light projection by calculating the size to decrease depending on the magnitude of the swivel angle.

In Step ST14, the CPU 44 determines whether the road surface rendered image 11 is expected to be outside the traveling lane of the road 90 where the vehicle 1 is traveling based on the position and size of light projection for the road surface rendered image 11 adjusted to move in Step ST13.

Thus, the CPU 44 can determine, based on detection by the external camera 35 or the like, whether the road surface rendered image 11 is expected to be outside the widthwise central position or the lane on the road 90 where the vehicle 1 is traveling when the position and size of the road surface rendered image 11 are changed. In one embodiment, the external camera 35 may serve as a detection device.

When the road surface rendered image 11 adjusted to move is expected not to be outside the traveling lane, the CPU 44 advances the process to Step ST7. In this case, the CPU causes the projection modules 53 to project light for the road surface rendered image 11 adjusted to move. On the curved road 90, the road surface rendered image 11 whose position and size have been adjusted so that the road surface rendered image 11 can move toward the inside of the curve is rendered within the range of the traveling lane. Then, the CPU 44 advances the process to Step ST8.

When the road surface rendered image 11 adjusted to move is expected to be outside the traveling lane, the CPU 44 advances the process to Step ST15.

In Step ST15, the CPU 44 causes the projection modules 53 to stop the light projection for the road surface rendered image 11 adjusted to move. Thus, the road surface rendered image 11 whose position and size have been adjusted so that the road surface rendered image 11 can move toward the inside of the curve is not rendered on the curved road 90 or the like. Then, the CPU 44 advances the process to Step ST8.

Accordingly, when the moved road surface rendered image 11 is expected to be outside the central position or the lane on the road 90 where the vehicle 1 is traveling, the CPU 44 can stop the road surface rendering by causing the projection modules 53 to stop the light projection.

In this embodiment described above, the position and size of the road surface rendered image 11 to be rendered on the road surface by projecting light from the projection modules 53 are adjusted based on the direction of the swivel operation of the headlamps to move the road surface rendered image 11 from the reference rendering position P1 of the road surface rendered image when the vehicle 1 is traveling along a straight road 90 toward the inside of the curve depending on the swivel angle of the headlamps. At this time, the shift amount from the reference rendering position P1 is set to increase as the swivel angle of the headlamps increases. Thus, the road surface rendered image 11 may be rendered near the point ahead on the curve that is viewed by the driver of the vehicle 1.

In this embodiment, the road surface rendered image 11 is moved in the headlamp swivel direction within the range in which the road surface rendered image 11 is not outside the lane of the road 90 where the vehicle 1 is traveling, that is, the widthwise central position or the lane on the road 90. Thus, it is possible to reduce the occurrence of a case where the light of the road surface rendered image 11 is radiated or reflected toward an oncoming vehicle or the like during the traveling along the curved road 90.

In this embodiment, when the vehicle 1 is traveling along a winding road or the like and therefore the curve direction of the road 90 changes successively between rightward and leftward directions, the light projection from the projection modules 53 is stopped so that the road surface rendered image 11 is not rendered on the road surface. Even when the right headlamp module 31 and the left headlamp module 32 are swiveling to change the light projection direction of the headlamps successively between rightward and leftward directions so that the light projection direction is continuously shifted toward the inside of the curve, the light projection from the projection modules 53 is stopped so that the road surface rendered image 11 is not rendered on the road surface. It is possible to reduce the occurrence of a case where the road surface rendered image 11 is continuously shifted rightward and leftward toward the inside of the curve.

The embodiments described above are exemplary embodiments of the disclosure but are not limitative, and various modifications or alterations may be made without departing from the scope disclosed herein.

In the embodiments described above, the projection module 53 is provided in the vehicle 1 while being integrated with the headlamp LEDs 51 and 52 in the right headlamp module 31 or the left headlamp module 32.

For example, the projection module 53 may be provided in the vehicle 1 separately from the right headlamp module 31 or the left headlamp module 32.

The vehicle 1 may include one, three, or more projection modules 53. The one projection module 53 or the third projection module 53 may be provided at the center of the front part of the vehicle in the width direction.

The rendering control device 21 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the rendering control device 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A vehicle with a road surface rendering function, the vehicle comprising:

a headlamp member comprising a headlamp light source, the headlamp member being configured to project light from the headlamp light source in a light projection direction;

a headlamp member controller comprising a first central processing unit (CPU) configured to determine a swivel angle of the headlamp member based on a shape of a road on which the vehicle is traveling and to determine the light projection direction based on the swivel angle of the headlamp member to control the headlamp member to project the light from the headlamp light source in the determined light projection direction;

a projection member comprising a projection light source different from the headlamp light source, the projection member being configured to project, using light from the projection light source, a road surface rendering image at a projection position on a road surface at least in a region forward of the vehicle; and a projection member controller comprising a second central processing unit (CPU) configured to determine the projection position of the road surface rendering image based on the swivel angle of the headlamp member and to control the projection member to project the road surface rendering image at the determined projection position, wherein, when the vehicle is traveling along a straight road, i) the headlamp member controller is configured to determine that the shape of the road is straight, determine a first swivel angle of the headlamp member based on the straight road, and control the headlamp member to project the light from the headlamp light source in a first projection direction based on the first swivel angle of the headlamp member and ii) the projection member controller is configured to determine a first projection position based on the first swivel angle of the headlamp member and to control the projection member to project the road surface rendering image at the first projection position, and wherein, when the vehicle is traveling along a curved road, i) the headlamp member controller is configured to determine that the shape of the road is curved, determine a second swivel angle of the headlamp member based on the curved road, and control the headlamp member to project the light from the headlamp light source in a second projection direction based on the second swivel angle of the headlamp member, the second swivel angle being offset from the first swivel angle toward an inside of a curve of the curved road and ii) the projection member controller is configured to determine a second projection position of the road surface rendering image based on the second swivel angle of the headlamp member and to control the projection member to project the road surface rendering image at the second projection position, the second projection position being offset from the first projection position toward the inside of the curve of the curved road.

2. The vehicle with the road surface rendering function according to claim 1, wherein the second projection position that is offset from the first projection position toward the inside of the curve of the curved road is located within a traveling lane of the vehicle.

3. The vehicle with the road surface rendering function according to claim 2, further comprising a detection device configured to perform detection of i) the road surface of the road where the vehicle is traveling and ii) the road surface rendering image projected onto the road surface, wherein the projection member controller is configured to
in response to the headlamp member controller controlling the headlamp member to project the light from the headlamp light source in the second light projection direction toward the inside of the curve, determine, based on the detection by the detection device, whether the second projection position of the road surface rendering image is expected to be outside the traveling lane of the vehicle; and control the projection member to stop projecting the road surface rendering image onto the road surface in response to determining that the second projection position of the road surface rendering image is expected to be outside the traveling lane of the vehicle based on the detection of the detection device.

4. The vehicle with the road surface rendering function according to claim 3, wherein the projection member controller is configured to, when a curve direction of the road where the vehicle is traveling changes successively between a rightward direction and a leftward direction, control the projection member to stop projecting the road surface rendering image onto the road surface while the headlamp member is controlled, by the headlamp member controller, to project the light from the headlamp light source in the second projection direction successively between the rightward direction and the leftward direction so that the second projection direction is continuously shifted toward the inside of the curve.

5. The vehicle with the road surface rendering function according to claim 1, further comprising a detection device configured to perform detection of i) the road surface of the road where the vehicle is traveling and i) the road surface rendering image projected onto the road surface, wherein the projection member controller is configured to:

in response to the headlamp member controller controlling the headlamp member to project the light from the headlamp light source in the second light projection direction toward the inside of the curve, determine, based on the detection by the detection device, whether the second projection position of the road surface rendering image is expected to be outside a traveling lane of the vehicle; and control the projection member to stop projecting the road surface rendering image onto the road surface in response to determining that the second projection position of the road surface rendering image is expected to be outside the traveling lane of the vehicle based on the detection of the detection device.

6. The vehicle with the road surface rendering function according to claim 5, wherein the projection member controller is configured to, when a curve direction of the road where the vehicle is traveling changes successively between a rightward direction and a leftward direction, control the projection member to stop projecting the road surface rendering image onto the road surface while the headlamp member is controlled, by the headlamp member controller, to project the light from the headlamp light source in the second projection direction successively between the rightward direction and the leftward direction so that the second projection direction is continuously shifted toward the inside of the curve.

7. A vehicle with a road surface rendering function, the vehicle comprising:

a headlamp member comprising a headlamp light source, the headlamp member being configured to project light from the headlamp light source in a light projection direction;

a projection member including a projection light source different from the headlamp light source, the projection member being configured to project, using light from the projection light source, a road surface rendering image at a projection position on a road surface at least in a region forward of the vehicle; and circuitry configured to:
determine a swivel angle of the headlamp member based on a shape of a road on which the vehicle is traveling and to determine the light projection direction based on the swivel angle to control the headlamp member to project the light from the headlamp light source in the determined light projection direction;

determine the projection position of the road surface rendering image based on the swivel angle of the headlamp member and to control the projection member to project the road surface rendering image at the determined projection position;

when the vehicle is traveling along a straight road, i) determine that the shape of the road is straight, ii) determine a first swivel angle of the headlamp member based on the straight road, iii) control the headlamp member to project the light from the headlamp light source in a first projection direction based on the first swivel angle of the headlamp member, iv) determine a first projection position based on the first swivel angle of the headlamp member, and v) control the projection member to project the road surface rendering image at the first projection position; and when the vehicle is traveling along a curved road, i) determine that the shape of the road is curved, ii) determine a second swivel angle of the headlamp member based on the curved road, iii) control the headlamp member to project the light from the headlamp light source in a second projection direction based on the second swivel angle of the headlamp member, the second swivel angle being offset from the first swivel angle toward an inside of a curve of the curved road, iv) determine a second projection position of the road surface rendering image based on the second swivel angle of the headlamp member, and v) control the projection member to project the road surface rendering image at the second projection position, the second projection position being offset from the first projection position toward the inside of the curve of the curved road.

* * * * *